(12) United States Patent
Lille

(10) Patent No.: US 7,193,817 B2
(45) Date of Patent: Mar. 20, 2007

(54) MAGNETIC HEAD HAVING HEAT SINK STRUCTURE

(75) Inventor: Jeffrey S. Lille, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 275 days.

(21) Appl. No.: 10/791,001

(22) Filed: Mar. 1, 2004

(65) Prior Publication Data

US 2005/0190495 A1 Sep. 1, 2005

(51) Int. Cl.
*G11B 5/40* (2006.01)
*G11B 5/31* (2006.01)

(52) U.S. Cl. .................................... 360/128
(58) Field of Classification Search ............... 360/128, 360/110

See application file for complete search history.

(56) References Cited

U.S. PATENT DOCUMENTS 6,731,461 B2* 5/2004 Yamada et al. ............. 360/126

2005/0047015 A1* 3/2005 Matono et al. ............. 360/126

OTHER PUBLICATIONS

IBM TDB Feb. 2002, No. 454, p. 314.*

* cited by examiner

*Primary Examiner*—Julie Anne Watko
(74) *Attorney, Agent, or Firm*—Robert O. Guillot; Intellectual Property Law Offices

(57) ABSTRACT

A magnetic head having a heat sink structure that is disposed proximate the induction coil to draw heat away from sensitive components of the head. The heat sink is fabricated above the second magnetic pole, and is therefore fabricated subsequent to the fabrication of the more delicate components of the magnetic head. In a preferred embodiment, the heat sink is fabricated photolithographically in the same process steps in which the electrical lead to the center tap of the induction coil is fabricated. The only difference in the magnetic head fabrication process is the modification of the photolithographic mask that is used to create the electroplating trench in which the electrical lead is electroplated, and the change to the mask involves the creation of a second opening within the mask for the creation of an electroplating trench at the location of the heat sink.

15 Claims, 4 Drawing Sheets

MAGNETIC HEAD HAVING HEAT SINK STRUCTURE

BACKGROUND OF THE INVENTION

1. Field of the Invention

The present invention relates generally to magnetic heads having inductive write head structures, and more particularly to such magnetic heads having heat sink structures formed therein for the dissipation of heat generated by the inductive write head.

2. Description of the Prior Art

Hard disk drives include magnetic heads that are designed to write data onto narrow data tracks upon the data disk of the disk drive, and to read data from the narrow data tracks. The ongoing effort to increase the areal data storage density of the hard disk drive results in the development and usage of ever smaller and increasingly delicate magnetic pole tips and magnetoresistive sensors for writing and reading increasingly smaller data bits onto the disk.

As is well known, the data writing process involves the use of an induction coil to generate magnetic fields within the magnetic poles of the write head, and the electrical current within the induction coil generates a significant amount of heat. The delicate pole tips and magnetoresistive sensor structures are increasingly susceptible to heat caused malfunction and damage as the size of these structures is diminished. It is therefore desirable to incorporate heat sink structures within the magnetic head that function to draw the unwanted heat away from the delicate magnetic head structures in order to promote operational reliability of the magnetic head, and to facilitate the development of smaller pole tips and sensor structures. The magnetic head of the present invention includes such heat sink structures, as is described hereinbelow.

SUMMARY OF THE INVENTION

In the magnetic head of the present invention a heat sink structure is disposed proximate the induction coil within the write head portion of the magnetic head to draw heat away from the sensitive pole tip and magnetoresistive sensor components of the head. In a first embodiment, a heat sink is fabricated above the second magnetic pole, and preferably in the same fabrication steps in which an electrical lead for the induction coil is fabricated. The heat sink is therefore fabricated subsequent to the fabrication of the more delicate components of the magnetic head, and therefore does not interfere with the intricate fabrication process steps for creating these components. In the preferred embodiment, the heat sink is fabricated photolithographically in the same process step in which the electrical lead to the center tap of the induction coil is fabricated, and the only difference in the magnetic head fabrication process is the modification of the photolithographic mask that is used to create the electroplating trench in which the electrical lead is electroplated. The change to the mask involves the creation of a second opening within the mask for the creation of an electroplating trench at the location of the heat sink. Thereafter, the heat sink is electroplated into its trench during the same electroplating step in which the electrical lead is electroplated into its trench.

Further embodiments of the invention include the fabrication of a second heat sink beneath the first magnetic pole, and the fabrication of thermal interconnects between the two heat sinks, and the fabrication of a thermal interconnect to the slider body for enhanced thermal dissipation.

It is an advantage of the magnetic head of the present invention that a heat sink is provided to protect sensitive components of the magnetic head from excessive operational heat.

It is another advantage of the magnetic head of the present invention that the fabrication of the heat sink is accomplished subsequent to the fabrication of delicate components of the magnetic head.

It is a further advantage of the magnetic head of the present invention that the pre-existing process for fabricating the delicate components of the magnetic head is not altered by the fabrication of the heat sink.

It is an advantage of the hard disk drive of the present invention that it includes a magnetic head of the present invention in which a heat sink is provided to protect sensitive components of the magnetic head from excessive operational heat.

It is an advantage of the process for fabricating a magnetic head of the present invention that the heat sink is fabricated in the same fabrication steps for the creation of the electrical leads to the induction coil of the magnetic head.

It is another advantage of the process for fabricating a magnetic head of the present invention that the only significant alteration in the process for fabricating the magnetic head is the alteration of the photolithographic mask which is utilized to fabricate an electrical lead of the induction coil of the magnetic head.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
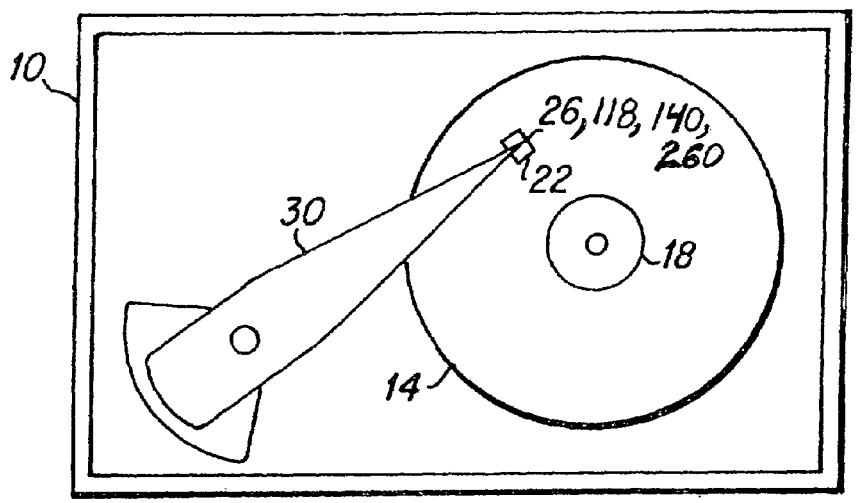
FIG. 1 is a schematic top plan view of a hard disk drive including the magnetic head of the present invention.

A simplified top plan view of a typical hard disk drive 10 which includes a magnetic head of the present invention is presented in FIG. 1. As depicted therein, at least one hard disk 14 is rotatably mounted upon a motorized spindle 18. A slider 22, having a magnetic head 26 disposed thereon, is mounted upon an actuator arm 30 to fly above the surface of each rotating hard disk 14, as is well known to those skilled in the art. The present invention includes improved features and manufacturing methods for such magnetic heads, and to better describe the present invention a prior art magnetic head is next described.

Figure 2:
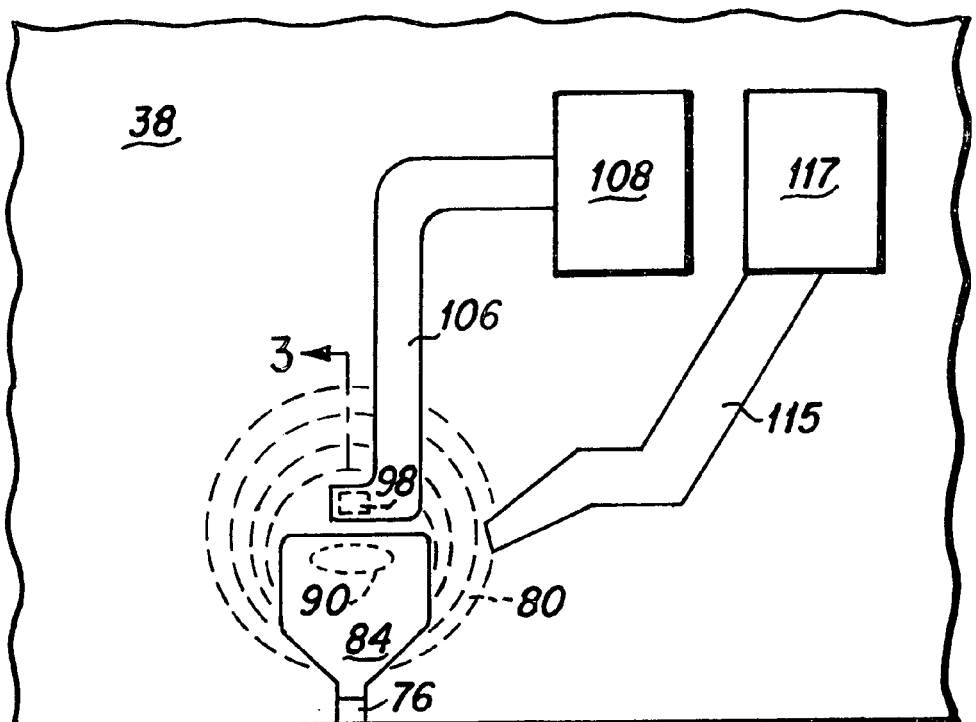
FIG. 2 is a top plan view depicting various components of a prior art magnetic head.
Figure 3:
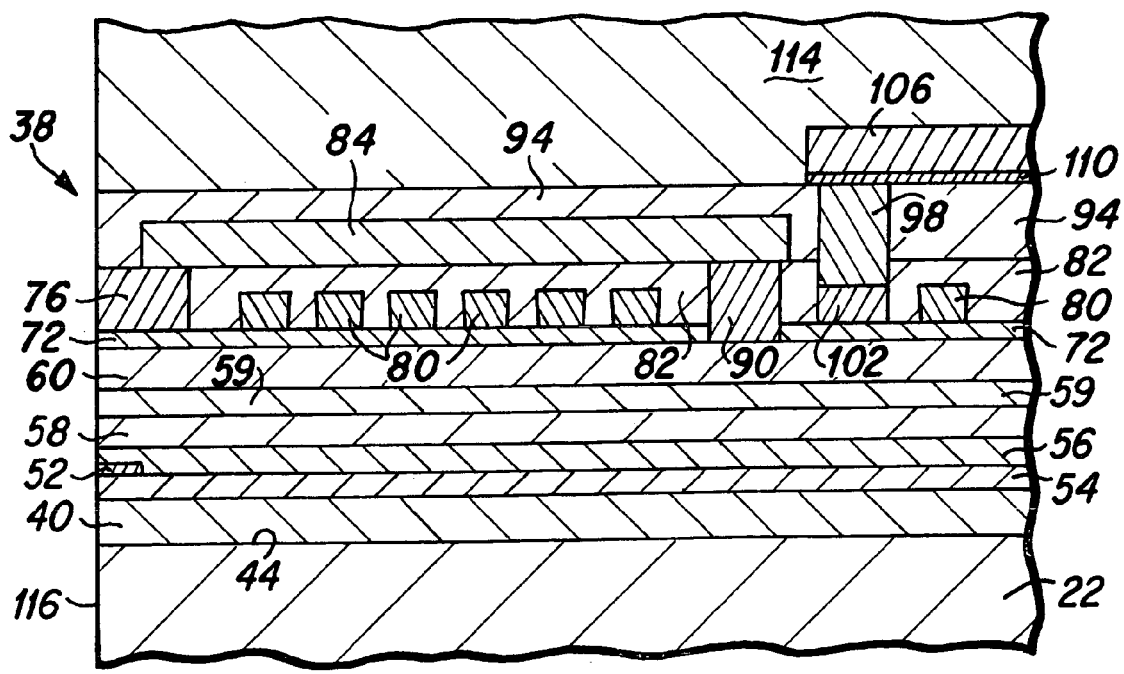
FIG. 3 is a side cross-sectional view taken along lines 3—3 of FIG. 2.

As will be understood by those skilled in the art, FIG. 2 is a top plan view and FIG. 3 is a side cross-sectional view taken along lines 3—3 of FIG. 2 that depict portions of a prior art magnetic head 38, termed a longitudinal magnetic head. As is best seen in FIG. 3, the magnetic head 38 includes a first magnetic shield layer (S1) 40 that is formed upon a surface 44 of the slider body material 22. A read head sensor element 52 is disposed within electrical insulation layers 54 and 56 and a second magnetic shield layer (S2) 58 is formed upon the insulation layer 56. An electrical insulation layer 59 is then deposited upon the S2 shield 58, and a first magnetic pole (P1) 60 is fabricated upon the insulation layer 59.

Following the fabrication of the P1 pole 60, a write gap layer 72 is deposited upon the P1 pole 60, followed by the fabrication of a P2 magnetic pole tip 76. An induction coil structure including coil turns 80 is then fabricated within insulation 82 above the write gap layer 72. Thereafter, a yoke portion 84 of the second magnetic pole is fabricated in magnetic connection with the P2 pole tip 76, and through back gap element 90 to the P1 pole 60. An insulation layer 94 is deposited above the yoke 84 and an electrical interconnect 98, typically composed of copper, is electroplated within a via that is formed through the insulation layer 94 down to the electrical center tap 102 of the coil 80. An electrical lead 106 is next fabricated upon the insulation layer 94 from the interconnect 98 to an electrical contact pad 108 of the magnetic head 38. The electrical lead 106 may be fabricated in a photolithographic process in which a seed layer 110, typically composed of copper, is deposited upon the insulation layer 94, followed by the fabrication of a patterned photoresist layer (not shown) in which an electrical lead trench (not shown) is formed. Thereafter, the electrical lead 106 is electroplated onto the seed layer within the trench. The photoresist and seed layer are subsequently removed (except the seed layer 110 beneath the electrical lead 106), and a further insulation layer 114 is deposited to encapsulate the magnetic head including the electrical lead 106. It is to be noted that the encapsulating insulation layer 114 is not depicted in FIG. 2, such that the electrical lead 106 and other components can be better seen. The other electrical lead 115 that connects the outer coil turn of the coil 80 with the contact pad 117 may be fabricated at the same time as the lead 106. The magnetic head 38 is subsequently fabricated such that an air bearing surface (ABS) 116 is created.

It is to be understood that there are many detailed features and fabrication steps of the magnetic head 38 that are well known to those skilled in the art, and which are not deemed necessary to describe herein in order to provide a full understanding of the present invention.

Figure 4:
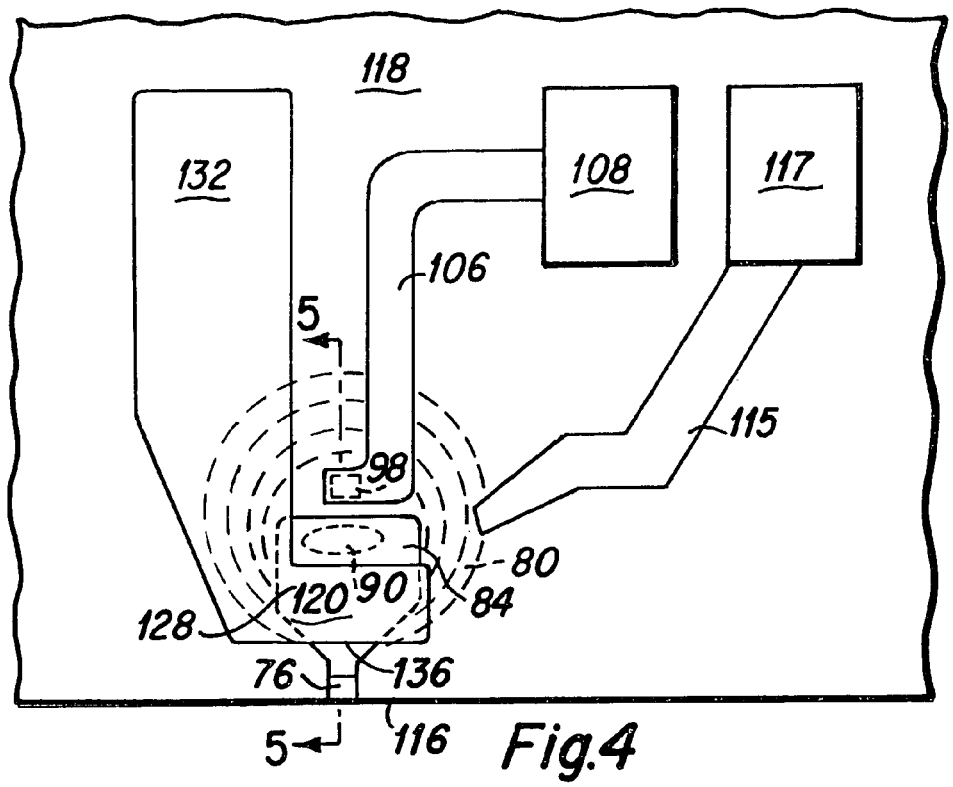
FIG. 4 is a top plan view depicting various components of a magnetic head of the present invention.
Figure 5:
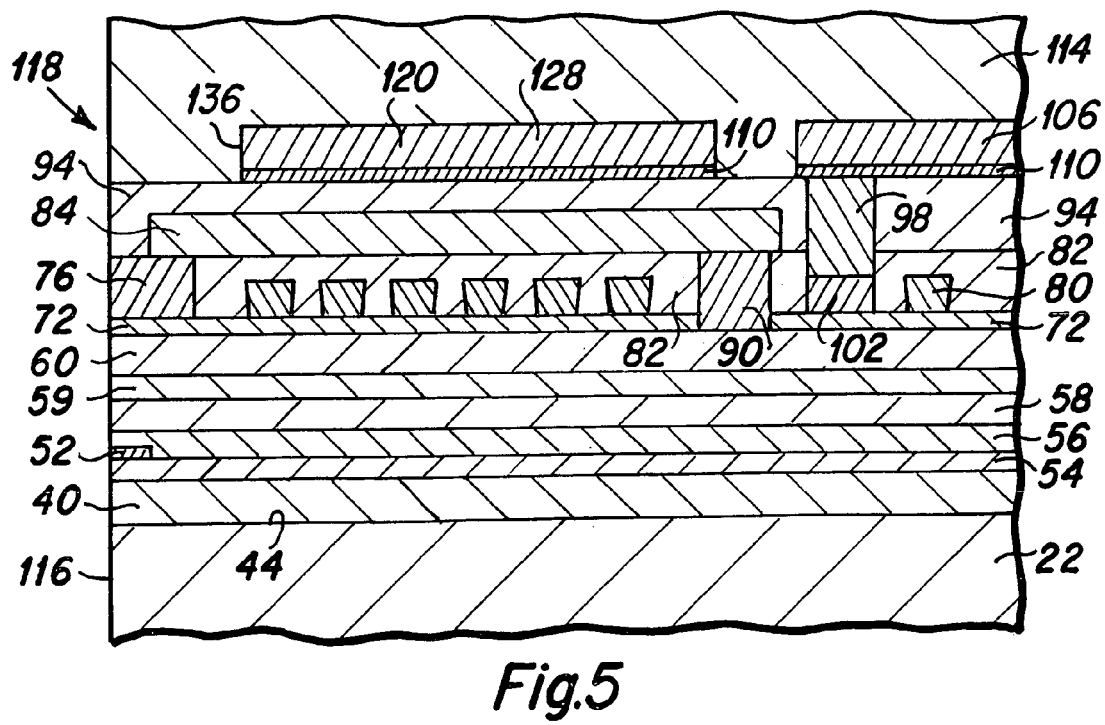
FIG. 5 is a side cross-sectional view taken along lines 5—5 of FIG. 4.

As will be understood from the following detailed description, the magnetic head of the present invention includes heat sink structures that are fabricated within the magnetic head to draw away excess heat that is generated within the induction coil and magnetic poles during the inductive write head operation. FIG. 4 is a top plan view depicting various components of a first embodiment of a magnetic head 118 of the present invention, and FIG. 5 is a side cross-sectional view of the magnetic head depicted in FIG. 4, taken along lines 5—5 of FIG. 4. The magnetic head of the present invention, as depicted in FIGS. 4 and 5 includes many structures and components of the prior art magnetic head depicted in FIGS. 2 and 3, and similar structures are similarly numbered for ease of comprehension. Therefore, as depicted in FIGS. 4 and 5, the magnetic head of the present invention may include a first magnetic shield layer (S1) 40 that is formed on a slider body 22, a read head sensor element 52 that is disposed within insulating layers 54 and 56, and a second magnetic shield layer (S2) 58 that is formed upon the insulation layer 56. An electrical insulation layer 59 is deposited upon the S2 shield 58, and a first magnetic pole (P1) 60 is fabricated upon the insulation layer 59. A write gap layer 72 is deposited upon the P1 pole 60, a P2 magnetic pole tip 76 is fabricated upon the write gap layer and an induction coil having coil turns 80 is fabricated within insulation 82 upon the write gap layer 72. Thereafter, a yoke portion 84 of the second magnetic pole is fabricated in magnetic connection with the P2 pole tip 76, and through the back gap element 90 to the P1 pole 60. Thereafter, an insulation layer 94 and an electrical interconnect 98 to the center tap 102 of the induction coil 80 is fabricated.

A heat sink structure 120 is next fabricated in the same electroplating steps in which the electrical lead 106 is fabricated. Particularly, following the deposition of the seed layer 110 upon the insulation layer 94 and a photoresist (not shown), the mask (not shown) that is utilized to fabricate the electrical lead trench for electroplating the electrical lead 106 is modified to simultaneously create a heat sink trench in a location above the yoke 84. Thereafter, when the electrical lead 106 is plated up into its trench, as is accomplished in the prior art magnetic head 38, the heat sink 120 is simultaneously plated up within the heat sink trench. The heat sink 120 is therefore plated up in the same layer of the magnetic head in which the electrical lead 106 is fabricated, and thus the heat sink 120 may be said to be coplanar with the electrical lead 106.

Following the removal of the photoresist and exposed seed layer, the encapsulation insulation layer 114 is deposited. The heat sink 120 may be formed in many shapes, and the heat sink 120 depicted in FIGS. 4 and 5 has a substantial portion 128 disposed above the yoke which is interconnected with a further substantial portion 132 that is fabricated away from the yoke 84 and toward the upper regions of the magnetic head structure. Heat generated in the yoke area is absorbed by the portion 128 of the heat sink 120 that is disposed above the yoke and conducted off to the further substantial portion 132 of the heat sink that is disposed in the upper regions of the head 118.

Significantly, this method of fabricating the heat sink 120 adds no new fabrication step to the magnetic head fabrication process. Rather, the fabrication of the heat sink 120 is accomplished by the simple step of modifying the electrical lead mask. It is therefore to be further understood that the magnetic head 118 of the present invention makes no significant changes in the fabrication of the read head portion of the magnetic head, and significantly that there is only a minimal change (in the electrical lead mask) to the fabrication of the write head portion of the magnetic head. Furthermore, the change to the fabrication of the magnetic head structures occurs after the critical features, (such as the read sensor 52 and P2 pole tip 76) have been fabricated.

Significant features of the heat sink 120 as depicted in FIGS. 4 and 5 are that the front edge 136 of the heat sink is fabricated back away from the ABS 116 of the head 118. This is important because where the heat sink is comprised of copper, corrosion and tribological problems are created when copper components are exposed at the ABS of a magnetic head. It is also to be noted that the embodiment of a heat sink 120 depicted in FIGS. 4 and 5 is not connected to other structures within the magnetic head. It functions to draw heat from the induction coil area for thermal dissipation within the non-critical upper regions of the magnetic head. Critical structures such as the read head sensor 52 and P2 pole tip 74 are thereby protected from excessive heat buildup during the operation of the inductive write head. In alternative embodiments, the heat sink 120 can be thermally interconnected by at least one interconnection member formed within the magnetic head to other heat sink structures, and/or to the slider body 22 for enhanced heat dissipation therewithin. An alternative embodiment of the present invention having such enhanced heat sink structures is next described with the aid of FIGS. 6 and 7.

Figure 6:
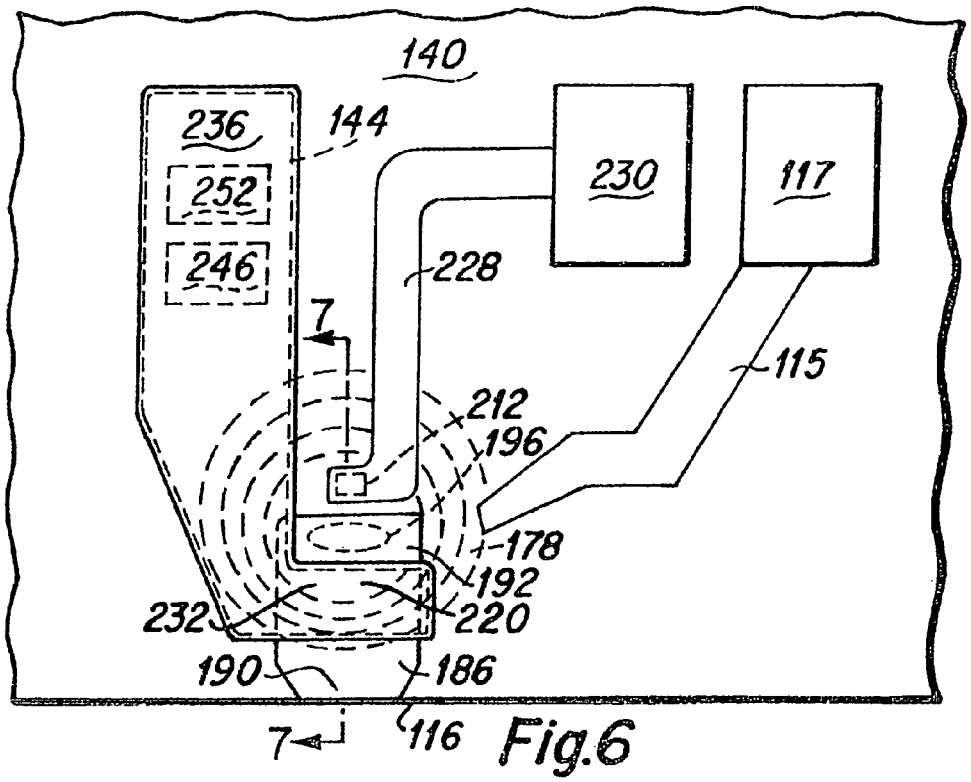
FIG. 6 is a top plan view depicting various components of another embodiment of the magnetic head of the present invention.
Figure 7:
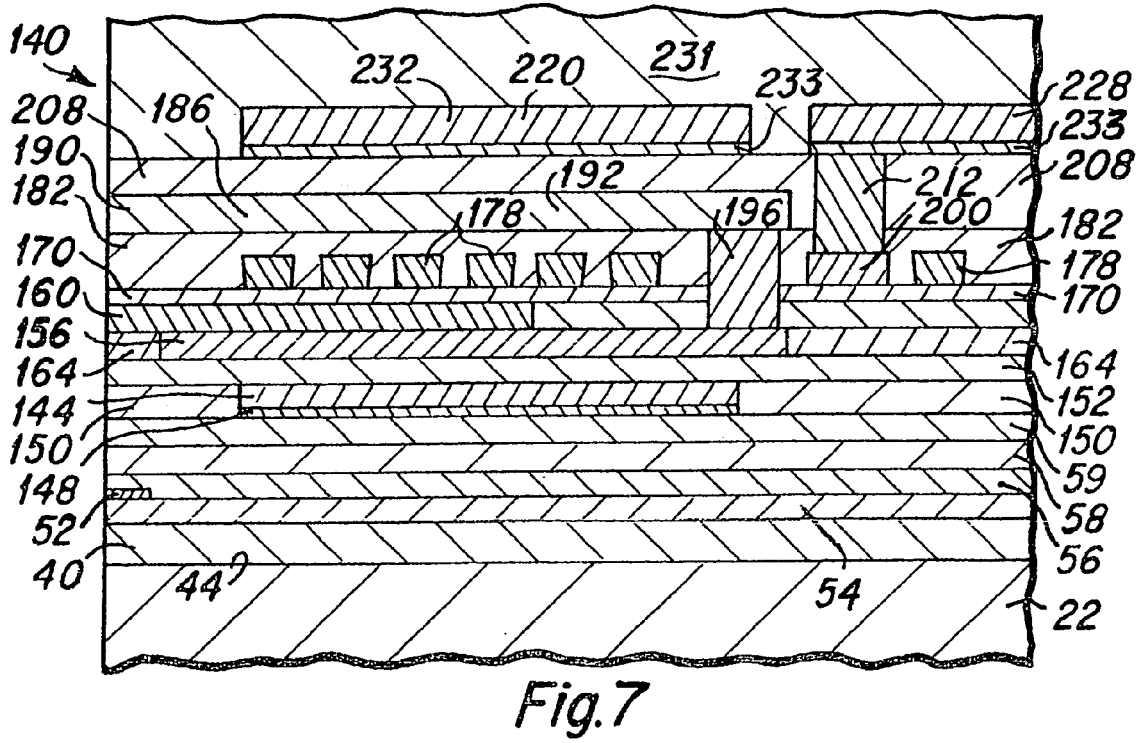
FIG. 7 is a side cross-sectional view of the device depicted in FIG. 6, taken along lines 7—7 of FIG. 6.

FIG. 6 is a top plan view of a magnetic head 140 of the present invention that is created in a head design style that is termed a perpendicular head, and FIG. 7 is a side cross-sectional view of the head depicted in FIG. 6, where FIG. 7 is taken along lines 7—7 of FIG. 6. As can best be seen in FIG. 7, the perpendicular magnetic head includes a read head portion that is similar to the read head depicted in FIGS. 2 and 4. That is, it includes a first magnetic shield layer (S1) 40 that is formed upon a slider body 22, a read head sensor element 52 that is disposed within insulating layers 54 and 56, and a second magnetic shield layer (S2) 58 that is formed upon the insulation layer 56. An electrical insulation layer 59 is deposited upon the S2 shield 58.

A lower heat sink structure 144 is next fabricated upon the electrical insulation layer 59. The lower heat sink structure may be fabricated utilizing well known photolithographic techniques in which a seed layer 148 typically comprised of copper, is deposited, followed by the fabrication of a photoresist layer (not shown) having a heat sink trench formed therein, followed by the electroplating of the lower heat sink structure 144 that is preferably comprised of copper upon the seed layer 148 within the trench. Thereafter, the photoresist and excess seed layer are removed, and insulation material such as alumina 150 is deposited, and a chemical mechanical polishing (CMP) step is performed to create a flat upper surface to the heat sink structure 144 for the continued fabrication of further magnetic head structures. This photolithographic process for forming the lower heat sink 144 is substantially similar to the process for fabricating the electrical lead and heat sink of the magnetic head embodiment 118 depicted in FIGS. 4 and 5. A significant feature of the lower heat sink structure 144 is that it is fabricated away from the air bearing surface 116 of the magnetic head to avoid corrosion and tribological problems that can be created where copper components are exposed at the ABS; thus a portion of the insulation 150 that surrounds the lower heat sink 144 is exposed at the ABS.

A further insulation layer 152 is next deposited upon the heat sink 144 and a first magnetic pole structure 156, termed a shaping pole, is fabricated upon the insulation layer 152. Thereafter, a narrow pole tip 160 of the perpendicular magnetic head is fabricated upon the first magnetic pole structure 156. In this perpendicular magnetic head 140, it is significant that the shaping pole 156 is spaced away from the ABS 116 by insulation 164 in which the pole is fabricated, such that only the pole tip 160 is exposed at the ABS. Thereafter, a further insulation layer 170 is fabricated upon the pole tip 160 and shaping pole 156, and an induction coil structure, typically comprised of copper coil turns 178, that is formed within electrical insulation 182, is fabricated upon the insulation layer 170. Thereafter, a second magnetic pole 186 is fabricated above the induction coil insulation 182. The second magnetic pole 186 includes a relatively broad magnetic flux return pole tip 190 together with a yoke portion 192 that is disposed above the induction coil 178, and which is magnetically connected through a backgap piece 196 to the shaping pole 156. The center tap 200 of the induction coil 178 is fabricated behind the interconnection of the yoke with the backgap piece. Thereafter, an electrical insulation layer 208 is deposited and a via for an electrical interconnect is created within the insulation layer 208 down to the center tap 200, and an electrical interconnect 212 is then electroplated up within the via. Thereafter, as is described hereabove with regard to the magnetic head embodiment 118 depicted in FIGS. 4 and 5, an upper heat sink structure 220 is fabricated during the fabrication steps that are conducted to form the electrical lead 228 from the center tap electrical interconnect 212 to the contact pads 230 of the magnetic head. Thus, the upper heat sink 220 may be fabricated in substantially the identical manner as the heat sink 120 of magnetic head 118. That is, in a photolithographic process in which a seed layer 233 is first deposited and the heat sink 220 and electrical leads 228 are electroplated within photoresist trenches. The photoresist and uncovered seed layer are thereafter removed, and an encapsulation layer 231 is subsequently deposited upon the magnetic head structures.

As is best seen in the top view of FIG. 6, the upper heat sink 220 is preferably formed with a first enlarged portion 232 that is disposed above the yoke 192 and which is interconnected to a second substantial portion 236 that is disposed away from the critical components of the head 140. The lower heat sink 144 may be formed with a shape that is similar to the shape of the upper heat sink 220. The two heat sinks 144 and 220 of the magnetic head embodiment 140 serve to provide enhanced heat dissipation from the inductive write head and provide thermal protection to the read sensor 52 and pole tip 160 structures of the magnetic head 140.

In an enhanced embodiment of the magnetic head 140, as is best seen in FIG. 6, a heat sink interconnect via (not shown) may be fabricated through insulation layers that have been deposited down to the lower heat sink structure 144. This heat sink interconnect via may be fabricated in the same via formation step in which the electrical interconnect via to the coil center tap is created. Thereafter, when the electrical interconnect 212 is electroplated, a heat sink interconnect 246 is also electroplated within the heat sink interconnect via. Then, when the upper heat sink 220 is fabricated it will be interconnected through the heat sink interconnect 246 with the lower heat sink 144 thereby providing enhanced thermal dissipation properties to the head.

In an still further enhanced magnetic head embodiment, a heat sink interconnect via (not shown) may be fabricated in insulation layers of the read head, such that a heat sink interconnect 252 is fabricated within the heat sink interconnect via during the fabrication of the electrical leads for the read head sensor. This heat sink interconnect 252 is formed away from the read head components, such as the S1 and S2 shields, to interconnect the lower heat sink 144 with the slider base 22. Where such a heat sink interconnect 252 is utilized, heat generated by the inductive write head can be dissipated through the lower heat sink 144 and/or the upper heat sink 220 down to the slider base 22 for further heat dissipation and thermal control of the magnetic head.

The devices depicted in FIGS. 5 and 7 include insulation layers (such as layer 94 in FIG. 5 and layers 152 and 208 in FIG. 7) that are formed between the heat sink structure and the magnetic pole from which the heat sink removes unwanted heat. It is therefore advantageous that the thickness of the insulation layers be as thin as is possible to improve the efficiency of the heat removal process of the heat sink. The insulation layers 94, 152 and 208 generally serve to insulate the effects of possible eddy currents within the heat sink and possible related magnetic flux flow problems within the magnetic poles that can lead to degraded device performance. However, where such problems are not significant, the insulation layers 94, 152 and/or 208 are not necessary, and FIG. 8 depicts a magnetic head 260 of the present invention that is similar to the device depicted in FIG. 7 in which the insulation layers 152 and 208 are not fabricated between the heat sinks and the magnetic poles.

Figure 8:
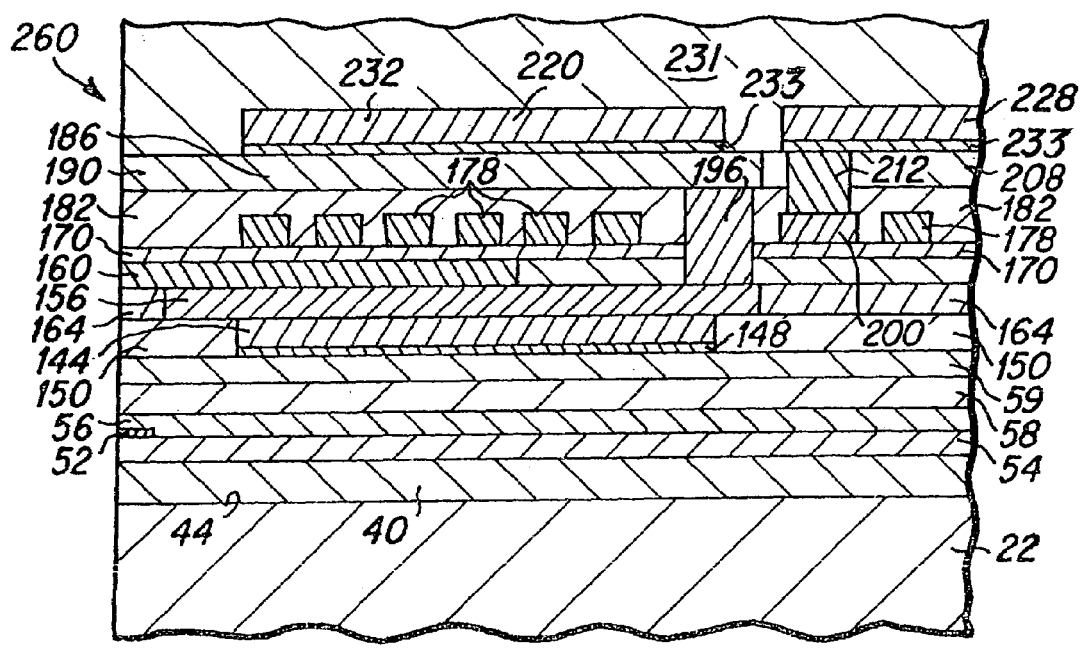
FIG. 8 is a side cross-sectional view showing improvements in the device depicted in FIG. 7 accomplished by the removal of certain insulation layers.

The alternative magnetic head 260 of the present invention, as depicted in FIG. 8, includes many identical structures to the magnetic head 140 depicted in FIG. 7, and like structures are numbered identically for ease of comprehension. As depicted in FIG. 8, the perpendicular magnetic head 260 includes a read head portion that is similar to the read head depicted in FIGS. 2 and 4. That is, it includes a first magnetic shield layer (S1) 40 that is formed upon a slider body 22, a read head sensor element 52 that is disposed within insulating layers 54 and 56, and a second magnetic shield layer (S2) 58 that is formed upon the insulation layer 56. An electrical insulation layer 59 is deposited upon the S2 shield 58.

A lower heat sink structure 144 is next fabricated upon the electrical insulation layer 59, and insulation material such as alumina 150 is deposited, and a chemical mechanical polishing (CMP) step is performed to create a flat upper surface to the heat sink structure 144 for the continued fabrication of further magnetic head structures.

A first magnetic pole structure 156, termed a shaping pole, is next fabricated upon the heat sink 144. Thereafter, a narrow pole tip 160 of the magnetic head is fabricated upon the first magnetic pole structure 156. A further insulation layer 170 is next fabricated upon the pole tip 160 and shaping pole 156, and an induction coil structure, typically comprised of copper coil turns 178, that is formed within electrical insulation 182, is fabricated upon the insulation layer 170. Thereafter, a second magnetic pole 186 is fabricated above the induction coil insulation 182. The second magnetic pole 186 includes a magnetic flux return pole tip 190 together with a yoke portion 192 that is disposed above the induction coil 178, and which is magnetically connected through a backgap piece 196 to the shaping pole 156. The center tap 200 of the induction coil 178 is fabricated behind the interconnection of the yoke with the backgap piece. Thereafter, an electrical insulation layer 208 is deposited, followed by a CMP step to remove insulation 208 from above the yoke 192. A via for an electrical interconnect is created within the insulation layer 208 down to the center tap 200, and an electrical interconnect 212 is then electroplated up within the via. Thereafter, as is described hereabove with regard to the magnetic head embodiment 140 depicted in FIGS. 6 and 7, an upper heat sink structure 220 is fabricated during the fabrication steps that are conducted to form the electrical lead 228 from the center tap electrical interconnect 212 to the contact pads 230 of the magnetic head. Thus, the upper heat sink 220 may be fabricated in substantially the identical manner as the heat sink 120 of magnetic head 118. That is, in a photolithographic process in which a seed layer 233 is first deposited, and the heat sink 220 and electrical leads 228 are electroplated within photoresist trenches. The photoresist and uncovered seed layer are thereafter removed, and an encapsulation layer 231 is subsequently deposited upon the magnetic head structures.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

I claim:

1. A magnetic head comprising:
   a write head portion including a first magnetic pole and a second magnetic pole;
   an induction coil being disposed at least in pan between said first and second magnetic poles;
   an electrical lead of said induction coil having an electrical lead thickness and being disposed in a layer of the magnetic head;
   a heat sink being disposed within said layer and being coplanar within the magnetic head with said electrical lead of said coil, said heat sink having a heat sink thickness that is equal to said electrical lead thickness, and wherein said heat sink is disposed directly upon a seed layer that is disposed at least in part directly upon said second magnetic pole.

2. A magnetic head as described in claim 1 wherein said electrical lead is comprised of copper and said heat sink is comprised of copper.

3. A magnetic head as described in claim 1 wherein said heat sink includes a first substantial portion that is disposed above said second magnetic pole, and another substantial portion tat is disposed away from said second magnetic pole.

4. A magnetic head as described in claim 3 wherein said heat sink is disposed away from an air bearing surface of the magnetic head.

5. A magnetic bead comprising:
   a write head portion including a first magnetic pole and a second magnetic pole;
   an induction coil being disposed at least in part between said first and second magnetic poles;
   an electrical lead of said induction coil being disposed in a layer of the magnetic head;
   a first heat sink being coplanar within the magnetic head with said electrical lead of said coil and a second heat sink, and wherein said first heat sink and said second heat sink are thermally interconnected by a heat sink interconnect member.

6. A magnetic head as described in claim 5 wherein said second heat sink is disposed below said first magnetic pole.

7. A magnetic head as described in claim 6 wherein said first heat sink is thermally interconnected through an interconnect member with a slider body portion of the magnetic head.

8. A magnetic head as described in claim 6 wherein said first heat sink is thermally interconnected with said second heat sink through an interconnect member, and said second heat sink is thermally interconnected with said slider body through a second interconnect member.

9. A magnetic head as described in claim 1 wherein said magnetic bead is a longitudinal head.

10. A magnetic head as described in claim 1 wherein said magnetic head is a perpendicular magnetic head.

11. A hard disk drive, comprising:
    at least one hard disk being adapted for rotary motion upon a disk drive;
    at least one slider device having a slider body portion being adapted to fly over said hard disk;
    a magnetic head being formed on said slider body for writing data to said hard disk, said magnetic head including:

a write head portion including a first magnetic pale and a second magnetic pole;

an induction coil being disposed at least in part between said first and second magnetic poles;

an electrical lead of said induction coil having an electrical lead thickness and being disposed in a layer of the magnetic head;

a heat sink being disposed within said layer and being coplanar within the magnetic head with said electrical lead of said coil, said heat sink having heal sink thickness that is equal to said electrical lead thickness, and wherein said heat sink is disposed directly upon a seed layer that is disposed at least in part directly upon said second magnetic pole.

12. A hard disk drive, comprising:

at least one hard disk being adapted for rotary motion upon a disk drive;

at least one slider device having a slider body portion being adapted to fly over said hard disk;

a magnetic head being formed on said slider body for writing data to said hard disk, said magnetic head including:

a write head portion including a first magnetic pole and a second magnetic pole;

an induction coil being disposed at least in part between said first and second magnetic poles;

an electrical lead of said induction coil being disposed in a layer of the magnetic head;

a first heat sink being coplanar within the magnetic head with said electrical lead of said coil and a second heat sink, and wherein said first heat sink and said second heat sink are thermally interconnected by a heat sink interconnect member.

13. A hard disk drive as described in claim 12 wherein said second heat sink is disposed below said first magnetic pole.

14. A hard disk drive as described in claim 13 wherein said first heat sink is thermally interconnected through an interconnect member with a slider body portion of the magnetic head.

15. A hard disk drive as described in claim 13 wherein said first heat sink is thermally interconnected with said second heat sink through an interconnect member, and said second heat sink is thermally interconnected with said slider body through a second interconnect member.

* * * * *